United States Patent
Jones

(10) Patent No.: US 9,834,319 B2
(45) Date of Patent: Dec. 5, 2017

(54) LIGHTNING PROTECTION FOR VEHICLES

(71) Applicant: BAE SYSTEMS PLC, London (GB)

(72) Inventor: Christopher Charles Rawlinson Jones, Preston (GB)

(73) Assignee: BAE Systems plc, London (GB)

( * ) Notice: Subject to any disclaimer, the term of this patent is extended or adjusted under 35 U.S.C. 154(b) by 95 days.

(21) Appl. No.: 14/775,935

(22) PCT Filed: Mar. 13, 2014

(86) PCT No.: PCT/GB2014/050755
§ 371 (c)(1),
(2) Date: Sep. 14, 2015

(87) PCT Pub. No.: WO2014/140584
PCT Pub. Date: Sep. 18, 2014

(65) Prior Publication Data
US 2016/0023777 A1    Jan. 28, 2016

(30) Foreign Application Priority Data

Mar. 14, 2013   (EP) ................................ 13275059
Mar. 14, 2013   (GB) ................................ 1304586.9

(51) Int. Cl.
*B64D 45/02*    (2006.01)
*B64D 7/00*    (2006.01)
*H05F 3/04*    (2006.01)

(52) U.S. Cl.
CPC ............. *B64D 45/02* (2013.01); *B64D 7/00* (2013.01); *H05F 3/04* (2013.01)

(58) Field of Classification Search
CPC ............. B64D 45/02; B64D 7/00; H05F 7/00
See application file for complete search history.

(56) References Cited

U.S. PATENT DOCUMENTS 3,416,027 A    12/1968   Amason et al.
3,906,308 A    9/1975   Amason et al.
(Continued)

FOREIGN PATENT DOCUMENTS

DE    102006046002 A1    4/2008
DE    102011112518 A1    11/2012
(Continued)

OTHER PUBLICATIONS

GB Search Report dated Aug. 14, 2013 of Patent Application No. GB1304587.7 filed Mar. 14, 2013.
(Continued)

*Primary Examiner* — Scott Bauer
(74) *Attorney, Agent, or Firm* — Maine Cernota & Rardin

(57) ABSTRACT

A vehicle (2) comprising a vehicle part (4), the vehicle part (4) comprising: an electrically conductive core (6); a non-electrically conductive outer skin (8) made of a radar-absorbent material which surrounds, at least to some extent, the core (6) such that the core (6) is not visible from outside the vehicle (2); and one or more electrically conductive members (10) electrically connected to the core (6); each of the one or more members (10) is a tapered member having a relatively large cross sectional area where that member (10) is electrically connected to the core (6), and tapers from its end that is connected to the core (6) to a point; and the point of each member (10) is located at an outer surface of the external skin (8) such that the point of each of the members (10) is exposed.

17 Claims, 2 Drawing Sheets

(56) References Cited

U.S. PATENT DOCUMENTS

| | | |
|---|---|---|
| 4,237,515 A | 12/1980 | Pierce, Jr. |
| 4,329,731 A | 5/1982 | Meulenberg, Jr. |
| 4,506,311 A | 3/1985 | Cline |
| 4,796,153 A | 1/1989 | Amason et al. |
| 4,824,713 A | 4/1989 | Brick |
| 5,225,265 A | 7/1993 | Prandy |
| 7,247,368 B1 * | 7/2007 | Rogers ................. C04B 35/521 250/515.1 |
| 2005/0213278 A1 | 9/2005 | Hawley |
| 2008/0137259 A1 | 6/2008 | Heeter et al. |
| 2009/0050735 A1 | 2/2009 | Sobol |
| 2009/0176112 A1 | 7/2009 | Kruckenberg |
| 2011/0174536 A1 * | 7/2011 | Wilson ................. B29C 70/443 174/84 S |
| 2012/0152611 A1 | 6/2012 | Fisher et al. |

FOREIGN PATENT DOCUMENTS

| | | | |
|---|---|---|---|
| EP | 0227122 A2 | 7/1987 | |
| EP | 1944236 A2 | 7/2008 | |
| EP | 2363429 A1 | 9/2011 | |
| FR | 2720194 A1 | 11/1995 | |
| FR | 2727784 A1 | 6/1996 | |
| FR | 2924687 A1 | 6/2009 | |
| GB | 1136895 A | 12/1968 | |
| GB | 1580321 A | 12/1980 | |
| GB | 2132027 A | 12/1984 | |
| GB | 2295594 A | 5/1996 | |
| GB | WO 2012116700 A1 * | 9/2012 | ........... F03D 1/0675 |
| WO | 2005071788 A2 | 8/2005 | |

OTHER PUBLICATIONS

EP Search Report dated Jul. 18, 2013 of Patent Application No. EP13275058.9 filed Mar. 14, 2013.
PCT Search Report dated Sep. 22, 2014 of Patent Application No. PCT/GB2014/050754 filed Mar. 14, 2013.
EP Search Report dated Jul. 12, 2013 of Patent Application No. EP13275059 filed Mar. 14, 2013.
GB Search Report dated Aug. 15, 2013 of Patent Application No. GB1304586.9 filed Mar. 14, 2013.
PCT Search Report dated Sep. 25, 2014 of Patent Application No. PCT/GB2014/050755 filed Mar. 13, 2014.

* cited by examiner

LIGHTNING PROTECTION FOR VEHICLES

RELATED APPLICATIONS

This application is a national phase application filed under 35 USC §371 of PCT Application No. PCT/GB2014/050755 with an International filing date of 13 Mar. 2014 which claims priority of GB Patent Application 1304586.9 filed 14 Mar. 2013 and EP Patent Application 13275059.7 filed 14 Mar. 2013. Each of these applications is herein incorporated by reference in their entirety for all purposes.

FIELD OF THE INVENTION

The present invention relates to vehicles and vehicle parts having lightning protection systems.

BACKGROUND

Many stealth vehicles, e.g. stealth aircraft, are designed so as to avoid being effectively detected or tracked by radar systems.

Passive low observable (LO) features may be used on a stealth vehicle to make it difficult for conventional radar to detect or track the vehicle effectively. For example, vehicle structures may be made of, or coated with a radar-absorbent material (RAM).

Radar-absorbent material is a class of materials that absorbs, to some extent, incident radar signals, thereby reducing the amount of radiation reflected. Radar-absorbent material tends to be relatively non-electrically conductive.

In a separate field, many aircraft are protected from the effects of lightning strikes by having an electrically conductive outer skin (e.g. an aluminium skin). Such a skin allows current to flow through the skin from the point of lightning impact, to some other point on the aircraft, without interruption or diversion to e.g. the interior of the aircraft or electronic aircraft systems.

SUMMARY OF THE INVENTION

In a first aspect the present invention provides a vehicle comprising a vehicle part, the vehicle part comprising: a relatively electrically conductive core; a relatively non-electrically conductive outer skin, the outer skin being made of a radar-absorbent material, the outer skin surrounding, at least to some extent, the core such that the core is not visible from outside the vehicle; and one or more relatively electrically conductive members; wherein each of the one or more members is electrically connected to the core; each of the one or more members is a tapered member having a relatively large cross sectional area where that member is electrically connected to the core, and tapers from its end that is electrically connected to the core to a point; and the point of each member is located at an outer surface of the external skin such that the point of each of the members is exposed.

The vehicle may be is a low observable (LO), i.e. stealth, aircraft. The vehicle part may be an aircraft wing. The one or more members may be positioned along a leading edge of the aircraft wing.

For a member, a point on the outer surface of the external skin at which that member is exposed may be the point on the outer surface of the external skin that is closest to the point on the core at which that member is electrically connected to the core.

For a member, that member electrically connects a first point to a second point via the shortest route between those points, the first point being a point on the outer surface of the external skin at which that member is exposed, the second point being a point on the core at which that member is electrically connected to the core.

The vehicle may comprise a plurality of members. The members may be arranged at irregular intervals over the vehicle part.

In some aspects, only the points of each of the members are exposed.

In a further aspect, the present invention provides a fleet comprising a plurality of vehicles, each vehicle according the first aspect, wherein a distribution pattern of electrically conductive members within one vehicle of the fleet is different to a distribution pattern of electrically conductive members within each other vehicle of the fleet.

In a further aspect, the present invention provides an aircraft panel comprising: a relatively electrically conductive first layer; a relatively non-electrically conductive second layer, the second layer being made of a radar-absorbent material, the second layer being disposed on the first layer; and one or more relatively electrically conductive members; wherein each of the one or more members is attached to the second layer; each of the one or more members is a tapered member having a relatively large cross sectional area where that member is attached to the second layer, and tapers from its end that is electrically connected to the second layer to a point; and the point of each member is located at a surface of the first layer that is not in contact with the second layer such that the point of each of the members is exposed.

In a further aspect, the present invention provides a method of producing a vehicle part, the method comprising: providing a relatively electrically conductive core; surrounding, at least to some extent, with a relative non-electrically conductive outer skin, the core such that the core is not visible from outside the vehicle part, the outer skin being made of a radar-absorbent material; providing one or more electrically conductive members, each member being a tapered member having a first end having a relatively large cross sectional area and a second end that is a point; and arranging the members such that: each of the one or more members is electrically connected to the core at its first end; and the point of each member is located at an outer surface of the external skin such that the point of each of the members is exposed.

The vehicle may be a low observable aircraft. The vehicle part may be an aircraft wing. The step of arranging the members may comprise positioning the members along a leading edge of the aircraft wing.

In a further aspect, the present invention provides a method of producing an aircraft panel, the method comprising: providing a relatively electrically conductive first layer; disposing, onto the first layer, a relatively non-electrically conductive second layer, the second layer being made of a radar-absorbent material; providing one or more electrically conductive members, each member being a tapered member having a first end having a relatively large cross sectional area and a second end that is a point; and arranging the members such that: each of the one or more members is electrically connected to the second layer at its first end; and the point of each member is located at a surface of the first layer that is not in contact with the second layer such that the point of each of the members is exposed.

In a further aspect, the present invention provides a lightning protection system for a vehicle, the vehicle comprising a vehicle part, the vehicle part comprising a relatively electrically conductive core and a relatively non-electrically conductive outer skin, the outer skin surrounding, at least to some extent, the core such that the core is not visible from outside the vehicle, the lightning protection system comprising one or more relatively electrically conductive members, wherein each of the one or more members is electrically connected to the core, and a portion of each of the one or more members is exposed at an outer surface of the external skin.

One or more of the members may be a member selected from a group of members consisting of an electrically conductive pin, an electrically conductive strip, an electrically conductive mesh, and a braid of electrical conductors.

A member may be a tapered member having a relatively large cross sectional area where that member is electrically connected to the core, and a relatively small cross sectional area where that member is exposed at an outer surface of the external skin.

The tapered member may taper to a point, the point of the tapered member being located at the outer surface of the external skin.

The external skin may be made of a radar-absorbent material.

The vehicle part may be an aircraft part for use on a low observable aircraft (e.g. an aircraft wing).

For a member, a point on the outer surface of the external skin at which that member is exposed may be the point on the outer surface of the external skin that is closest to the point on the core at which that member is electrically connected to the core.

For a member, that member may electrically connect a point on the outer surface of the external skin at which that member is exposed to a point on the core at which that member is electrically connected via the shortest route between those points.

The lightning protection system may comprise a plurality of members. The members may be arranged at irregular intervals over the vehicle part.

In a further aspect, the present invention provides a vehicle part comprising a lightning protection system in accordance with the above aspect.

In a further aspect, the present invention provides a vehicle comprising a vehicle part in accordance with the preceding aspect.

In a further aspect, the present invention provides a fleet of vehicles comprising a plurality of vehicles, each vehicle being a vehicle in accordance with the preceding aspect, wherein a distribution pattern of electrically conductive members within a vehicle of the fleet is different to a distribution pattern of electrically conductive members within each other vehicle of the fleet.

In a further aspect, the present invention provides a method of providing a vehicle part, the method comprising providing a relatively electrically conductive core, providing a relative non-electrically conductive outer skin such that the outer skin surrounds, at least to some extent, the core such that the core is not visible from outside the outer skin, and providing one or more relatively electrically conductive members such that each of the one or more members is electrically connected to the core and a portion of each of the one or more members is exposed at an outer surface of the external skin, thereby providing the vehicle part.

The vehicle part may be an aircraft part (e.g. an aircraft wing) for use on an aircraft.

DETAILED DESCRIPTION

Figure 1:
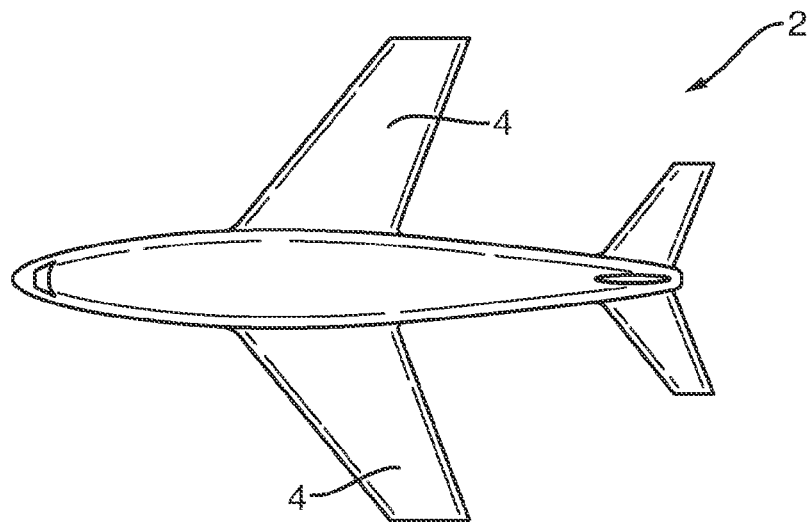
FIG. 1 is a schematic illustration (not to scale) of a top view of an example aircraft.

FIG. 1 is a schematic illustration (not to scale) of a top view of an example aircraft 2 in which an embodiment of an aircraft wing 4 is implemented.

In this embodiment, the aircraft 2 is a manned aircraft. However, in other embodiments, the aircraft 2 is an unmanned or autonomous aircraft.

In this embodiment, the aircraft 2 has two wings 4. However, in other embodiments, the aircraft 2 comprises a different number of wings 4.

In this is embodiment, the aircraft 2 is a Low Observable aircraft, i.e. an aircraft that is relatively difficult to detect using radar systems.

Figure 2:
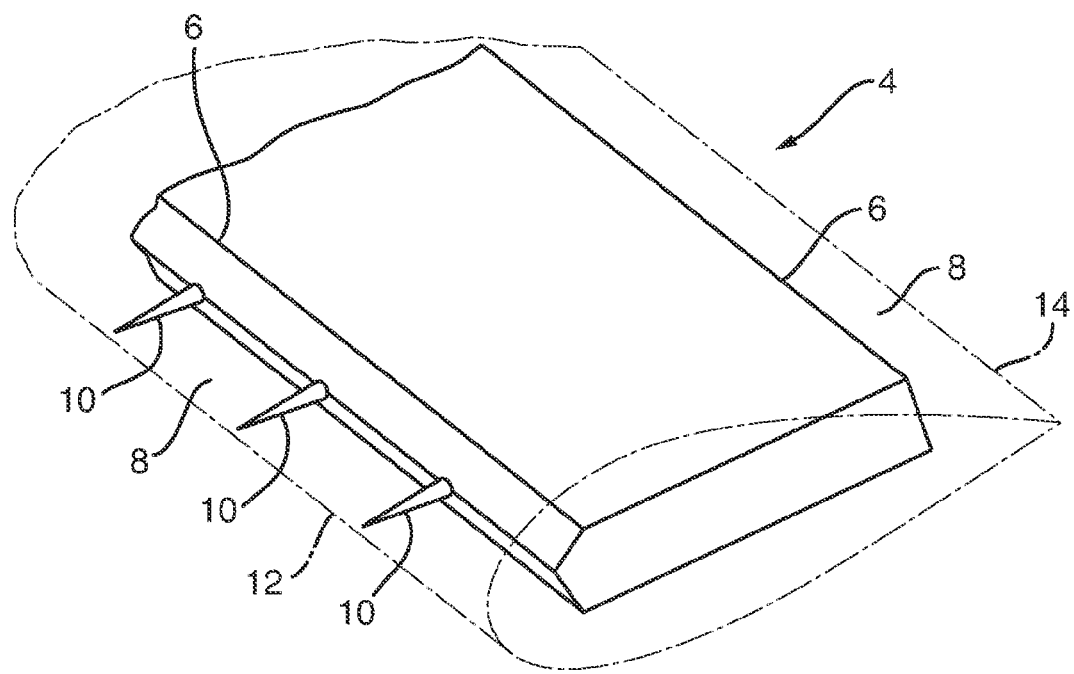
FIG. 2 is a schematic illustration (not to scale) showing a perspective view of the structure of an aircraft wing.

FIG. 2 is a schematic illustration (not to scale) showing a perspective view of the structure of an aircraft wing 4. In this embodiment, both wings 4 of the aircraft 2 have the structure shown in FIG. 2 and described in more detail later below.

In this embodiment, an aircraft wing 4 comprises an internal core or frame 6, an external skin 8, and a plurality of protrusions or pins 10.

The frame 6 of the aircraft wing 4 (indicated in FIG. 2 by solid lines) is made of an electrically conductive material such as a metal (e.g. aluminium) or a carbon fibre composite.

The external skin 8 of the aircraft wing 4 (indicated in FIG. 2 by dotted lines) is formed around, i.e. encases, the frame 6 so as to produce an aircraft wing 4 having an aerofoil-shaped cross-section. A leading edge of the aerofoil is indicated in FIG. 2 by the reference numeral 12. A trailing edge of the aerofoil is indicated in FIG. 2 by the reference numeral 14.

In this embodiment, the external skin 8 is made of a radar-absorbent material (RAM) such as a foam absorber. The RAM that forms the external skin 8 of the aircraft wing 4 is less electrically conductive than the material that forms the frame 6.

In other embodiments, the external skin 8 of the aircraft wing 4 is made of a different type of material, i.e. instead of RAM. This different material may be relatively electrically non-conductive compared to the frame material. In such embodiments, the external skin may be coated with an outer layer that may be RAM e.g. a radar absorbent paint.

Each of the pins 10 is made of an electrically conductive material. For example, each of the pins may be made out of the same material as the frame 6.

In this embodiment, each of the pins 10 is a cone-shaped pin that tapers from its base to an apex or vertex. In other embodiments, one or more of the pins 10 is a different shape (i.e. a shape other than a cone), e.g. a cylinder, a cuboid, a strip, a mesh etc.

Preferably, each of the pins 10 has a relatively large cross-sectional area at the end of the pin 10 that is in contact with (i.e. connected to) the frame 6, and has a relatively small cross-sectional area at the end of the pin 10 that is at the outer surface of the external skin 8. Preferably, each of the pins 10 tapers from its end that is in contact with the frame 6 to its end that is at the outer surface of the external skin 8.

Each of the pins extends from the frame 6 of the aircraft wing 4 to an outer surface of the external skin 8. In particular, in this embodiment, the base of each of the pins 10 is attached to the frame 6 (in such a way that an electrical current may flow from a pin 10 to the frame 6 and vice versa, i.e. such that the electrically conductive pins 10 are electrically in contact with the electrically conductive frame 6), and the vertex of each pin 10 is located at an external or outer surface of the external skin 8. In this embodiment, the vertex of each of the pins 10 is exposed (i.e. is contactable) at the outer surface of the external skin 8.

In this embodiment, each of the pins 10 has a sharp point at the outer surface of the external skin 8.

In this embodiment, the pins 10 are spaced apart from each other and arranged such that the vertices of the pins 10 are located along the leading edge 12 of the wing aerofoil.

Also, in other embodiments, one or more of the pins 10 extend from the frame 6 to the outer surface of the external skin 8 at a different location in the aircraft 4 to that described above and shown in FIG. 2. For example, in some embodiments, one or more pins 10 extend from a different point on the frame 6 to that described above and/or extend to a different point on the outer surface of the external skin 8 to that described above (e.g. one or more pins extend to the surface of the external skin 8 at the trailing edge 14).

Figure 3:
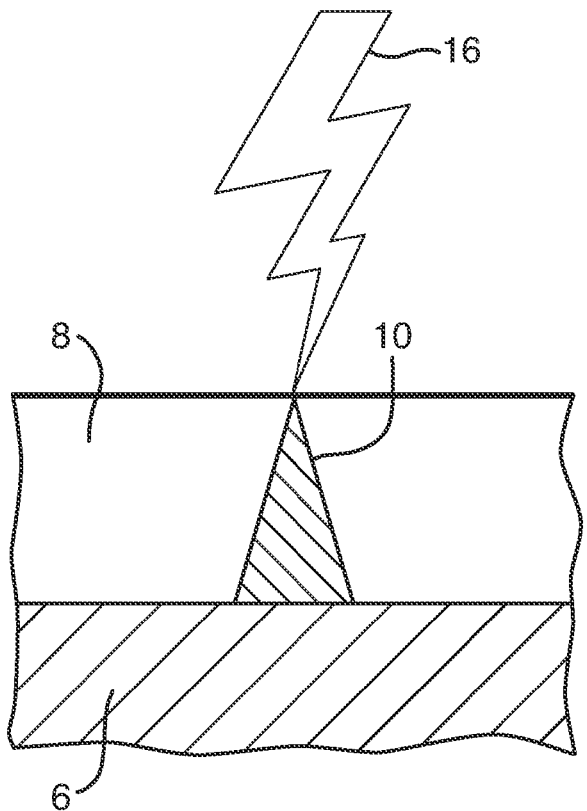
FIG. 3 is a schematic illustration (not to scale) depicting a scenario in which the aircraft wing is struck by lightning.

FIG. 3 is a schematic illustration (not to scale) depicting a scenario in which the aircraft wing 4 is struck by lightning 16.

Each of the pins 10 has a sharp point (i.e. vertex) at the outer surface of the external skin 8. The sharp points of the pins 10 are in contact with (i.e. point towards) the air surrounding the aircraft wing 4. The shape of a pin 10 tends to promotes very high electric field gradients being at the created at the vertex (i.e. sharp point) of that pin 10. The high electric field gradients created at the pin vertex tend to create a corona discharge that attracts lightning 16.

In other words, in this embodiment, the pins 10, in effect, act as lightning rods that use corona discharge to create conductive paths in the air that point towards the pin 10 and attract lightning 16 towards the pin 10.

Thus, in this embodiment, as shown in FIG. 3, when lightning 16 strikes the aircraft wing 4, the lightning tends to strike one or more of the pins 10. The electrically conductive pins 10 advantageously have a higher electrical conductivity (i.e. a lower resistance) than the external skin 8 (i.e. the RAM). Thus, electrical current will flow through the pin 10 struck by the lightning 16, as opposed to through the external skin 8. The electrical current of the lightning strike 16 will travel through the pin 10 struck by the lightning 16 to the frame 6. The current will then travel through the electrically conductive frame 6 of the aircraft wing 4 and through electrically conductive structures of the aircraft 2 connected to the frame 6, and exit from the aircraft 2 at some other location, e.g. at an extremity of the aircraft 2.

Thus, the pins 10 advantageously tend to guide potentially-damaging lightning away from material and structures (e.g. the external skin 8 made of the RAM). Thus, the likelihood of damage to the RAM external skin 8 due to the lightning strike 16 advantageously tends to be reduced.

In particular, for a further aircraft wing having an electrically conductive core or frame and non-electrically conductive RAM external skin surrounding that frame, and no electrically conductive members connecting an outer surface of the external skin and the electrically conductive frame, if that further aircraft wing is struck by lightning, e.g. on the outer surface of its external skin, the external skin will tend to be punctured at least to some extent by the lightning. For example, the lightning may puncture the non-electrically conductive RAM material to contact with the electrically conductive frame beneath. Furthermore, the lightning arc making contact with the electrically conductive frame may produce rapidly expanding gases at or proximate to the point of contact. These rapidly expanding gases may force the RAM external skin of the further aircraft wing away from its frame. Furthermore, a portion of the force with which the RAM external skin is expelled away from the frame may be reflected, e.g. by the RAM external skin, back towards the frame of the further aircraft wing. This reflected force may cause damage to the frame of the further aircraft wing. The electrically conductive pins described above with reference to FIGS. 1 to 3 advantageously tend to alleviate or eliminate these problems.

The aircraft wing 4 described above with reference to FIGS. 1 to 3 has an external skin 8 that is made of a RAM. Thus, it tends to be difficult for radar systems to detect the aircraft wing 4. In the above embodiment, only the vertex (i.e. the sharp tip) of each of the pins 10 is exposed (i.e. is contactable/visible) at the outer surface of the external skin 8. Thus, the pins 10 in the aircraft wing tend to have a small (e.g. minimal) radar cross section (i.e. it tends to be difficult for radar systems to detect the pins 10).

Thus, the aircraft wing 4 described above with reference to FIGS. 1 to 3 advantageously tends to maintain the low observable property of the aircraft (i.e. maintain the level of difficulty experienced when detecting the aircraft 2 using a radar system), whilst offering protection to the aircraft against lightning strikes 16.

Furthermore, for the above mentioned further aircraft wing having an electrically conductive core or frame and non-electrically conductive RAM external skin surrounding that frame and no electrically conductive members connecting an outer surface of the external skin and the electrically conductive frame, if that further aircraft wing is struck by lightning and the RAM skin of the further wing is punctured, or blown away from the frame, the frame of the further aircraft wing may be exposed. This would tend to increase the visibility the further aircraft wing to radar systems. The electrically conductive pins described above with reference to FIGS. 1 to 3 advantageously tend to alleviate or eliminate this problem.

In some embodiments, portions of the electrically conductive pins that may be relatively good radar reflectors (e.g. the bases of the pins) may be made to be less observable to a radar system e.g. by applying a RAM material to this portion of the pin so as to absorb both incident and reflected radar radiation.

In the above embodiments, the electrically conductive pins are used to electrically connect an electrically conductive aircraft frame with an external surface of the aircraft wing. However, in other embodiments, the electrically conductive pins are used to electrically connect an electrically conductive aircraft frame with an external surface of a different part of the aircraft. Also, in other embodiments, the electrically conductive pins are implemented on a different type of entity, i.e. instead of an aircraft, e.g. a Low Observable ship, or a ground-based vehicle.

In the above embodiments, the electrically conductive pins are used to electrically connect an electrically conductive aircraft frame with an external surface of the aircraft wing. Preferably, the electrically conductive pins connect the frame to the external surface of the aircraft wing via the shortest possible route. Preferably, the particular point on the external surface of the aircraft wing to which a pin connects a particular point on the frame is the point on the external surface of the aircraft wing that is closest to that point on the frame. This advantageously tends to provide that, when struck by lightning, the electrical current is along the shortest possible path from the external surface of the aircraft wing to the frame.

In the above embodiments, the external skin of the aircraft wing is made of RAM. However, in other embodiments, the external skin of the aircraft wing is made of a different type of non-electrically conductive material.

In some embodiments, each electrically conductive pins comprises a braid (e.g. a flat braid) of thin conductors, rather than a single (e.g. cone shaped) conductor. This tends to be preferable due to the "skin effect".

Preferably, the pins are spaced apart from each other at irregular interval. Also, preferably, if implemented on multiple vehicles, the pattern of pins over each vehicle is different. This tends to increase the difficulty of identifying or classifying the vehicle using its radar cross section.

Figure 4:
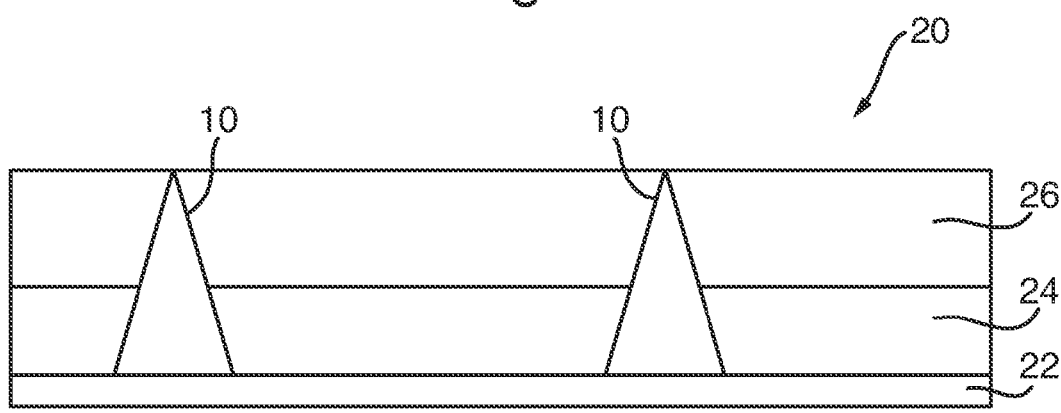
FIG. 4 is a schematic illustration of side view cross section of an aircraft panel for use on an aircraft.

In the above embodiments, each electrically conductive pin tapers to a point along its entire length from an end having a large cross sectional area. However, in other embodiments, one or more of the pins does not taper along its entire length, for example as shown in FIG. 4 and described below. For example, one or more of the electrically conductive pins may include a portion that has a uniform size and shape cross sectional area along its entire length, and an end portion that tapers to a point.

In the above embodiments, the above described lightning protection system is implemented in an aircraft wing. However, in other embodiments, the lightning protection system may be implemented in a different part of an aircraft or a part that is to be attached to or implemented on an aircraft. What will now be described is a further embodiment of the lightning protection system implemented in an aircraft door or panel.

FIG. 4 is a schematic illustration of side view cross section of an aircraft panel 20 (e.g. an aircraft door) for use on an aircraft.

In this further embodiment, the aircraft panel 20 comprises a plurality of electrically conductive pins 10 and three layers of material, namely a first layer 22, a second layer 24, and a third layer 26.

In this embodiment, an upper surface of the third layer 26 is an exposed surface. A lower surface of the third layer 26 is in contact with and bonded to an upper surface of the second layer 24. A lower surface of the second layer 24 is in contact with and bonded to an upper surface of the first layer 22. A lower surface of the first layer 22 is an exposed surface. Thus, the second layer 24 is "sandwiched" between the first and third layers 22, 26.

It will be appreciated that relative terms such as upper and lower, and so on are used merely for ease of reference to the Figures, and these terms are not limiting as such, and any two differing directions or positions and so on may be implemented.

In this embodiment, the third layer 26 is made of a radar-absorbent material (RAM) such as a foam absorber or a radar absorbent paint.

In this embodiment, the second layer 24 is made of carbon fibre composite. In this embodiment, the second layer is relatively electrically conductive (e.g. compared to the third layer 26). However, in some embodiments, the second layer 24 is electrically non-conductive. Also, in some embodiments, the second layer 24 may be omitted.

In this embodiment, the first layer 22 is made of an electrically conductive material, for example a metal. The first layer 22 may be a mesh layer bonded to the underside of the second layer 24. In some embodiments, the edges of the first layer 22, i.e. the regions of the first layer 22 proximate to the periphery of the panel 20, are thicker than other regions of the first layer 22.

In this embodiment, the pins 10 are as described above with reference to FIGS. 1 to 3, i.e. each pin 10 is made of an electrically conductive material. Each of the pins 10 is a cone-shaped pin that tapers from its base to an apex or vertex.

In this embodiment, each of the pins 10 has a relatively large cross-sectional area at the end of the pin 10 that is in contact with (i.e. connected to) the first layer 22. Each pin 10 tapers, from the end connected to the first layer 22, to a sharp point located at the upper surface of the third layer 26. Thus, each pin 10 is located through the entire thickness of both the first and second layers 22, 24.

In this embodiment, the pins 10 are spaced apart from each other.

In use, the aircraft panel 20 may be attached to an aircraft airframe by attaching the first layer 22 to the frame (i.e. such that the first layer and the frame are electrically connected).

Advantageously, the above described aircraft panel provides protection against lightning strikes whilst at the same time having only a small (e.g. minimal) radar cross section due to only the vertex (i.e. the sharp tip) of each of the pins being exposed at the upper surface of the third layer.

The invention claimed is:

1. A vehicle (2) comprising a vehicle part (4), the vehicle part (4) comprising:
   an electrically conductive core (6);
   a non-electrically conductive outer skin (8), the outer skin (8) being made of a radar-absorbent material, the outer skin (8) surrounding, at least to some extent, the core (6) such that the core (6) is not visible from outside the vehicle (2); and
   one or more electrically conductive members (10); wherein
   each of the one or more members (10) is electrically connected to a surface of the core (6) adjacent to the outer skin (8);
   each of the one or more members (10) is a tapered member having a larger cross sectional area where that member (10) is electrically connected to the surface of the core (6), than a cross sectional area of opposite end of the member (10), and tapers from its end that is electrically connected to the surface of the core (6) to a point; and
   the point of each member (10) is located at an outer surface of the external skin (8) such that the point of each of the members (10) is exposed
   wherein at least one of the members (10) comprises a braid of electrical conductors, thereby providing conductivity greater than a solid member due to a conductivity skin effect.

2. The vehicle (2) according to claim 1, wherein the vehicle (2) is a low observable aircraft.

3. The vehicle (2) according to claim 2, wherein the vehicle part (4) is an aircraft wing.

4. The vehicle (2) according to claim 3, wherein the one or more members are positioned along a leading edge of the aircraft wing.

5. The vehicle (2) according to claim 1, wherein, for a member (10), a point on the outer surface of the external skin (8) at which that member (10) is exposed is the point on the outer surface of the external skin (8) that is closest to the point on the core (6) at which that member (10) is electrically connected to the core (6).

6. The vehicle (2) according to claim 1, wherein, for a member (10), that member (10) electrically connects a first point to a second point via the shortest route between those points, the first point being a point on the outer surface of the external skin (8) at which that member (10) is exposed, the second point being a point on the core (6) at which that member (10) is electrically connected to the core (6).

7. The vehicle (2) according to claim 1, wherein the vehicle (2) comprises a plurality of members (10) and the members (10) are arranged at irregular intervals over the vehicle part (4).

8. The vehicle (2) according to claim 1, wherein only the points of each of the members (10) are exposed.

9. A fleet comprising a plurality of vehicles (2), each vehicle (2) being a vehicle (2) in accordance with claim 1, wherein a distribution pattern of electrically conductive members (10) within a vehicle (2) of the fleet is different to a distribution pattern of electrically conductive members within each other vehicle (2) of the fleet.

10. An aircraft panel (20) comprising:
   an electrically conductive first layer (22);
   a non-electrically conductive second layer (24, 26), the second layer (26) including a radar-absorbent material, the second layer (24, 26) being disposed on the first layer (22); and
   one or more electrically conductive members (10); wherein
   each of the one or more members (10) is attached to a surface of the first layer (22) adjacent to the second layer (24, 26);
   each of the one or more members (10) is a tapered member having a larger cross sectional area where that member (10) is attached to the surface of the first layer (22) than a cross sectional area of opposite end of the member (10), and wherein the member tapers from its end that is electrically connected to the surface of the first layer (22) to a point; and
   the point of each member (10) is located at a surface of the second layer (24, 26) that is not in contact with the first layer (22) such that the point of each of the members (10) is exposed;
   wherein edges of the first layer (22), in regions of the first layer (22) proximate to a periphery of the panel (20), are thicker than other regions of the first layer (22).

11. The method according to claim 9, wherein the vehicle (2) is a low observable aircraft.

12. The method according to claim 10, wherein the vehicle part (4) is an aircraft wing.

13. The method according to claim 12, wherein the step of arranging the members comprises positioning the members (10) along a leading edge of the aircraft wing.

14. A method of producing an aircraft panel (20), the method comprising:
   providing an electrically conductive first layer (22);
   disposing, onto the first layer (22), a non-electrically conductive second layer (24, 26), the second layer (24, 26) being made of a radar-absorbent material;
   providing one or more electrically conductive members (10), each member (10) being a tapered member having a first end having a larger cross sectional area than a cross sectional area of a second end, and the second end that is a point; and
   arranging the members such that:
      each of the one or more members (10) is electrically connected to the surface of the first layer (22) at its first end; and
      the point of each member (10) is located at a surface of the second layer (24, 26) that is not in contact with the first layer (22) such that the point of each of the members (10) is exposed;
   wherein edges of the first layer (22), in regions of the first layer (22) proximate to a periphery of the panel (20), are thicker than other regions of the first layer (22).

15. The method of claim 14, wherein at least one of the members (10) is a pin, each pin having a cylindrical body portion between the first end and the point of the second end, wherein the cylindrical body tapers near the second end to a sharp point at the second end.

16. The method of claim 14, wherein the first layer (22) is a mesh layer bonded to the underside of the second layer (24).

17. The method of claim 14, wherein the second layer (24) comprises a carbon fibre composite.

* * * * *